3,314,742
SCREEN FOR MOVIES AND THE LIKE
Burton D. Morgan, Hudson, Ohio, assignor to Morgan Adhesives Company, Stow, Ohio, a corporation of Ohio
Filed Nov. 6, 1964, Ser. No. 409,467
4 Claims. (Cl. 350—117)

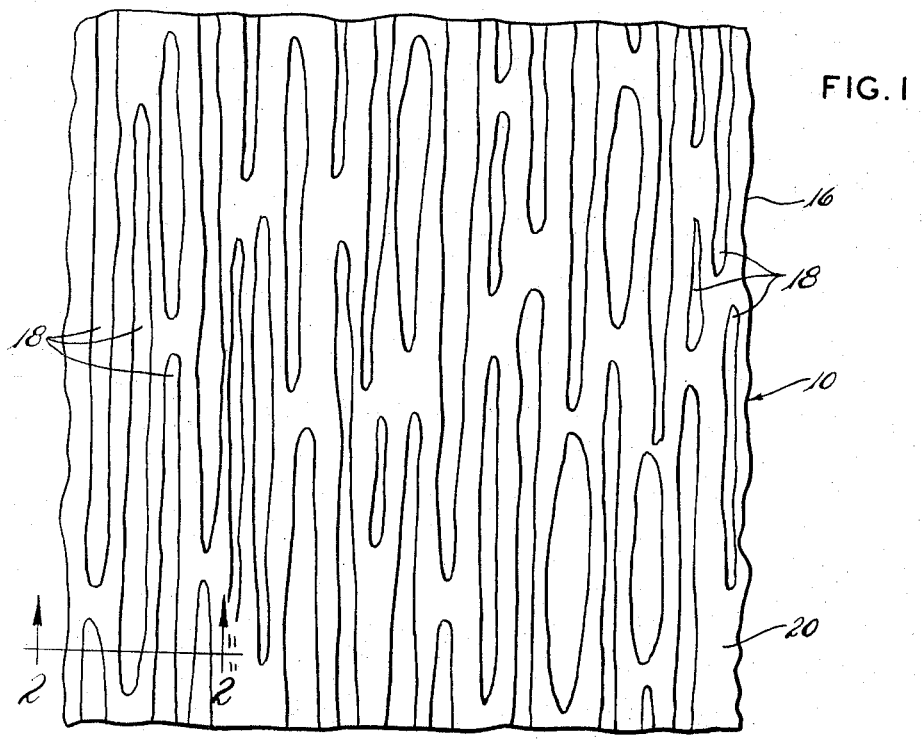
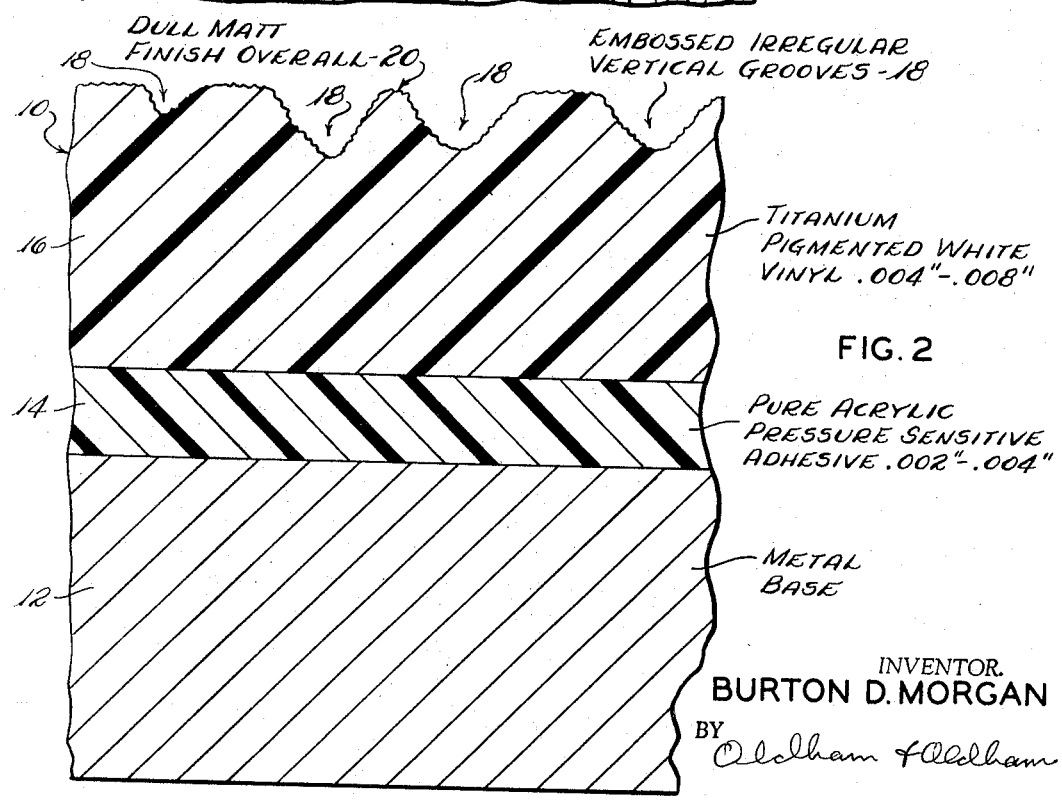

ABSTRACT OF THE DISCLOSURE

An outdoor movie screen formed from a white pigmented vinyl having vertically extending grooves or ridges therein in order to diffuse light projected thereagainst horizontally. A dull mat finish is provided over the entire exposed surface of the vinyl sheet to enhance the light diffusion characteristics of the screen.

---

This invention relates to screens adapted to have light projected pictures thrown thereagainst, and, more particularly, is concerned with outdoor movie screens.

It is the general object of the present invention to provide a better, but a less expensive projection screen, such as used for outdoor movies.

Another object of the invention is to provide a screen of the character described including a white pigmented vinyl sheet secured by a pressure sensitive adhesive layer to a base.

Another object of the invention is the provision of a screen for the projection of pictures by light thereagainst, the screen having a random pattern of non-continuous minute grooves embossed thereon vertically to diffuse light horizontally.

Another object of the invention is the provision of an outdoor movie screen made from embossed vinyl plastic which is self cleaning from rain and which has a low content of plasticizer and is secured to a base by pure acrylic adhesives so that the screen will have an exceptionally long life, such as 25 years.

The foregoing objects of the invention, and other objects which will become apparent as the description proceeds are achieved by the combination in an outdoor movie screen of a substantially vertically standing rigid base member having the desired screen height, width and contour, a substantially weather resistant pressure sensitive adhesive coat on the base member in the area of the desired screen and having a thickness of between about .001 in. and about .004 in., and a sheet of vinyl pressed on the adhesive coat over the area of the screen, the vinyl being pigmented with titanium between about 10% and about 50% by weight, the vinyl having less than about 65% plasticizer therein, the vinyl sheet having a thickness of between about .004 in. and about .008 in., the vinyl sheet having an embossed pattern of non-continuous random grooves and ridges thereon extending vertically to diffuse the light horizontally, the distance from the bottom of the grooves to the top of the ridges being less than about .001 in., and a dull mat finish over the entire exposed surface of the vinyl sheet.

For a better understanding of the invention reference should be had to the accompanying drawings, wherein:

FIGURE 1 is a fragmentary enlarged front elevation of a projection screen of the invention and illustrating the embossed surface pattern; and FIGURE 2 is an enlarged fragmentary cross sectional view taken substantially on line 2—2 of FIGURE 1.

In the drawings, the numeral 10 indicates generally the improved projection screen of the invention and comprising a base 12 of suitable type, but which will usually be made of metal when the screen is utilized as an outdoor movie screen. The base 12 is of the desired size and contour and is normally positioned substantially vertically, as will be understood.

Secured to the base 12 is a layer 14 of weather resistant pressure sensitive adhesive, for example one based on acrylic polymers, having a usual thickness of between about .002 in. and .004 in.

Secured to the layer 14 of pressure sensitive adhesive is a sheet 16 of titanium pigmented white vinyl having a usual thickness of between about .004 in. and about .008 in. Titanium in an amount between about 10% and about 50% by weight is employed for pigmenting purposes.

The vinyl sheet 16 has only a very low content of plasticizer, for example between about 25% and about 65% by weight so as to enhance the life of the vinyl and to reduce any migration of the plasticizer into the adhesive layer 14.

The outer surface of the vinyl sheet 16 is embossed with a random pattern of non-continuous minute grooves 18, as best seen in FIGURE 1 of the drawings, these grooves extending vertically in the surface of the sheet 16. The grooves 18 likewise appear in enlarged form in FIGURE 2 of the drawings and define vertically extending prism-like surfaces which diffuse projected light horizontally so as to enhance the brilliancy of the picture observed on the screen. Additionally the entire outer surface of the sheet 16 is embossed to a dull mat finish overall as indicated by the numeral 20 to further enhance the effectiveness of the screen. Normally the grooves 18 have a depth of not over .001 inch, a width of not over .001 inch and a length of not over 1 inch. In a typical pattern the grooves 18 had a width and depth of about .00035 inch and a length of about .5 inch in the longest grooves and with various other grooves being of shorter length.

The resulting projection screen when positioned substantially vertically in use with the grooves 18 extending vertically is self cleaning when it rains, but is additionally easily cleaned with a detergent spray. The screen is particularly brilliant and attractive in use for reasons already set forth, and is particularly durable and long lived. For a large movie screen the sheet 16 of vinyl is made from a plurality of vinyl strips into a large sheet covering or forming the desired screen surface.

While a certain respresentative embodiment and details have been shown for the purpose of illustrating the invention, it will be apparent to those skilled in this art that various changes and modifications may be made therein without departing from the spirit or scope of the invention.

What is claimed is:

1. The combination in an outdoor movie screen of a substantially vertically standing rigid base member having the desired screen height, width and contour, a weather resistant pressure sensitive adhesive coat on the base member in the area of the desired screen and having a thickness of between about .001 in. and about .004 in., and a sheet of vinyl pressed on the adhesive coat over the area of the screen, the vinyl being pigmented with titanium between about 10% and about 50% by weight, the vinyl having less than about 50% plasticizer therein, the vinyl sheet having a thickness of between about .004 in. and about .008 in., the vinyl sheet having an embossed pattern of non-continuous random grooves and ridges thereon extending vertically to diffuse the light horizontally, the distance from the bottom of the grooves to the top of the ridges being less than about .001 in., and a dull mat finish over the entire exposed surface of the vinyl sheet.

2. The combination in an outdoor movie screen of a substantially vertically standing rigid base member having the desired screen height, width and contour, a substantially pure acrylic pressure sensitive adhesive coat on the base member in the area of the desired screen and having a thickness of between about .001 in. and about .004 in., and a sheet of low plasticizer content, white pigmented vinyl pressed on the adhesive coat over the area of the screen, the vinyl sheet having a thickness of between about .004 in. and about .008 in., the vinyl sheet having an embossed pattern of non-continuous random grooves and ridges thereon extending vertically to diffuse the light horizontally, the distance from the bottom of the grooves to the top of the ridges being less than about .001 in., and a dull mat finish over the entire exposed surface of the vinyl sheet.

3. The combination in an outdoor movie screen of a substantially vertically standing rigid base member having the desired screen height, width and contour, a pressure sensitive adhesive coat on the base member in the area of the desired screen and having a thickness of between about .001 in. and about .004 in., and a sheet of low plasticizer content, white pigmented vinyl pressed on the adhesive coat over the area of the screen, the vinyl sheet having a thickness of between about .004 in. and about .008 in., the vinyl sheet having an embossed pattern of non-continuous random grooves and ridges thereon extending vertically to diffuse the light horizontally, and a dull mat finish over the entire exposed surface of the vinyl sheet.

4. A screen for the projection of pictures by light thereagainst including a base, a pressure sensitive adhesive layer on the base, and a white pigmented vinyl sheet secured to the layer, said sheet having a random pattern of non-continuous minute grooves and ridges embossed thereon extending vertically to diffuse light horizontally, and a dull mat finish over the entire exposed surface of the vinyl sheet.

References Cited by the Examiner
UNITED STATES PATENTS

| | | | |
|---|---|---|---|
| 1,890,828 | 12/1932 | Richardson et al. | 88—28.9 |
| 2,432,928 | 12/1947 | Palmquist. | |
| 2,558,244 | 6/1951 | Gibbons | 88—28.93 X |
| 2,579,892 | 12/1951 | Wright | 88—28.9 |
| 2,928,131 | 3/1960 | Mahler | 88—28.93 X |
| 2,974,566 | 3/1961 | Hurley | 88—28.9 |
| 3,016,794 | 1/1962 | Crandon | 88—28.9 |
| 3,273,455 | 9/1966 | Kaufmann et al. | 88—28.9 |

JULIA E. COINER, *Primary Examiner.*